June 23, 1959     I. L. NILSSON     2,891,671

FILTER DRUM FOR RECOVERING FIBERS FROM LIQUID

Filed April 20, 1956

Inventor:
Ivar Linus Nilsson

2,891,671
FILTER DRUM FOR RECOVERING FIBERS FROM LIQUID

Ivar Linus Nilsson, Vargon, Sweden

Application April 20, 1956, Serial No. 579,486

Claims priority, application Sweden December 19, 1955

2 Claims. (Cl. 210—211)

The invention relates to a filter drum for recovering fibers from diluted fiber suspensions, such as for instance backwater from paper-making machines or other waste water containing fibers. More particularly the invention relates to a horizontal and rotatable filter drum of the type which is provided with an axial inlet for liquid to be filtered and an axial outlet for concentrated fiber pulp. A funnel placed within the drum and connected to the outlet is adapted to collect concentrated fiber pulp removed from the inside of the drum above the liquid level.

Generally backwater from paper-making machines contains a rather great amount of finer fibers, and to retain such fibers at the filtration it has previously been proposed (U.S. application Serial No. 466,601, now Patent No. 2,765,915) to blow in a finely divided flow of air into the fibre suspension supplied to the drum, whereby small air bubbles adhere to the coarser fibers and lift them upwards towards the liquid surface. By means of a special device these coarser fibers carried by air bubbles are guided to the point where at the rotation the drum jacket is immersed in the liquid, so that they are the first to hit the wire-cloth. Thus said coarse fibers will form a porous layer retaining the finer fibers.

The invention involves a new embodiment within this idea and comprises a stationary screen mounted within the drum and extending axially along the drum jacket and at some distance therefrom. In the cross section of the drum, said screen extends from a point slightly below the liquid level downwards in the direction of rotation along a minor section of the drum periphery so as to form a channel, through which liquid will flow downwards at the rotation of the drum. The topmost layer of liquid, having a higher percentage of air-borne coarser fibers, will thereby be sucked towards the upper end of the channel and when passing through the channel said coarser fibers will to a great extent adhere to the wire-cloth.

Generally the drum jacket is at its inside provided with axially directed, spaced ribs or bars which are intended to contribute in retaining the layer of fibers settled on the wire-cloth, particularly at the point where the drum jacket moves upwards during rotation. If the screen according to the invention is mounted at such a distance from the jacket that said ribs will sweep closely past the screen a particularly effective pumping effect is obtained.

The accompanying drawing shows a suitable embodiment of the device according to the invention.

Figure 1:
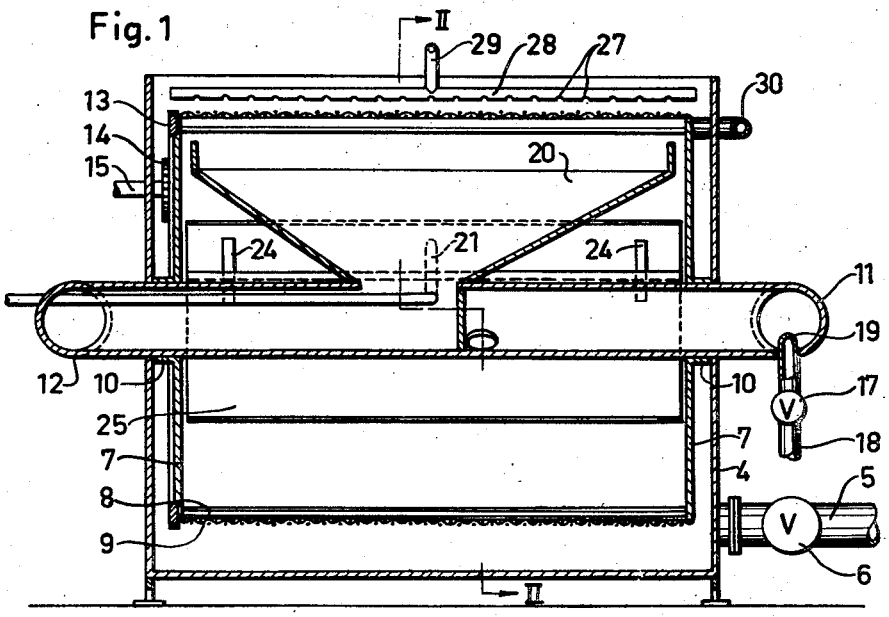
Figure 2:
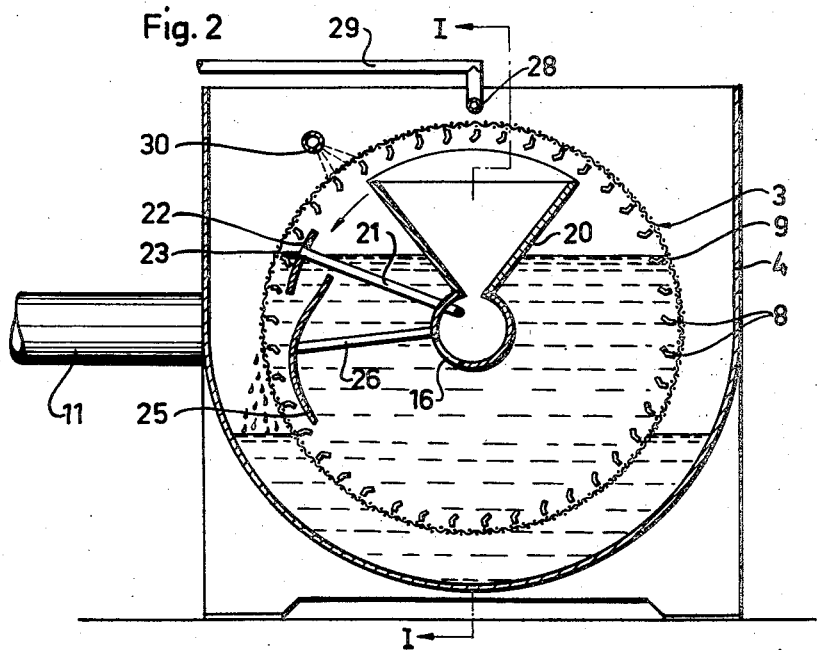

Figure 1 shows a filter drum in longitudinal section along the lines I—I in Figure 2, and Figure 2 shows a cross section of the drum along the lines II—II in Figure 1.

3 is a filter drum mounted in a vessel 4 provided with an outlet 5 near the bottom. The outlet is controlled by a valve 6. The filter drum consists of two solid, circular end walls 7 joined by means of ribs or bars 8 which support the wire-gauze 9 forming the drum jacket. The two end walls are provided with hubs 10 journalled on fixed, horizontal tubes 11 and 12 which are inserted through the two opposite end walls of the vessel in axial alignment with each other. The rotation of the drum at a low speed may be effected by means of a gear comprising for instance a toothed rim 13 secured to one end wall of the drum and engaging with a pinion 14 mounted on a driving shaft 15 introduced through the wall of the vessel. In the embodiment shown it is presumed that the drum rotates counterclockwise in Figure 2.

The tube 11 is adapted to supply the pulp water to the interior of the filter drum, and for this purpose it has an outlet opening 16 located approximately at the middle of the drum and directed obliquely downwards at the side of the tube which is turned towards the part of the drum surface that moves downwards during the rotation. The water is maintained at a predetermined level in the claim by means of a level regulator not shown. A conduit 18 having a shut-off valve 17 and leading from a source of compressed air is connected to a spraying nozzle 19 inserted in the tube 11 outside the vessel 4 for supplying a finely divided flow of air. The small air bubbles thus introduced into the liquid adhere to the coarser fibers which are lifted towards the liquid surface where they assemble and form a surface layer.

A vertical funnel 20 is mounted inside the drum to collect the concentrated fibers removed from the wire-gauze as will be described below. The upper, wider portion of the funnel extends substantially along the whole inner length of the drum and its lower end is connected with the tube 12 through which the concentrated pulp is passed to a storage container, not shown.

The diluted pulp water to be filtered often contains an amount of coarse fibers insufficient for the formation of an effective filtering layer. To overcome this it is suitable to supply a minor amount of a more concentrated suspension containing substantially coarser fibers, preferably to the point where the wire-gauze passes down into the liquid. In the embodiment shown in the drawing a device is provided for this purpose. A conduit from a vat (not shown) containing a pulp of coarser fibers is introduced through the tube 12 to the middle of the drum. From there the conduit 21 extends approximately radially through the wall of the tube 12 towards the drum jacket and ends just above the liquid surface at a distance from the part of the drum jacket that moves downwards at the rotation. The conduit 21 passes a screen 22 mounted axially along the drum jacket and extending slightly above as well as below the liquid level. The screen 22 has for its purpose to distribute the fibers supplied through the orifice 23 of the conduit 21 along the wire-gauze, so that a layer retaining the finer fibers is formed on the wire-gauze as soon as it is submerged. Hereby I eliminate a loss of fibers otherwise unavoidable at the beginning of the filtering operation. The screen 22 is supported partly by the conduit 21, partly by brackets 24 (Fig. 1) fixed to the two tubes 11 and 12 in parallel to the tube 21.

A baffle plate 25 also extending axially along the drum jacket is mounted below the screen 22 and is supported by rods 26 projecting radially from the tubes 11 and 12. As seen in cross section in Fig. 2, the lower portion of the baffle plate 25 is concentric with the periphery of the drum at least a distance corresponding to the space between two ribs 8. The space between this lower portion of the baffle plate 25 and the wire-gauze is only slight greater than the radial width of a rib 8. The ribs are preferably gutter-shaped to serve as pumping means when passing downwards through the channel and hereby they cause a flow of liquid directed downwards along the wire-gauze. The upper portion of the baffle plate 25 is bent somewhat inwards to form an inlet passage close to the inside of the upper screen 22 and the upper end of the baffle plate 25 is located slightly below the liquid surface. Owing to the pumping effect mentioned above the surface layer of the liquid, which has a greater concentration of coarse fibers, is thus sucked through the inlet passage into the channel formed between the baffle plate 25 and the drum jacket. The coarse fibers supplied in this way will thus further build up the filtering fiber layer that has already begun to settle on the drum jacket outside the upper screen 22. As the wire-gauze moves downwards the liquid pressure increases, so that a thicker layer of fibers is required to retain the finest fibers.

If no special supply of coarse fibers should be required, it is of course possible to eliminate the conduit 21 and the upper screen 22. In such case the lower baffle plate 25 may consist exclusively of a plate substantially concentric to the drum jacket and having its upper edge ending slightly below the liquid surface.

The filtered liquid is collected in the surrounding vessel 4 and discharged through the outlet 5. The liquid level within the vessel 4 is controlled by manipulation of the valve 6.

When the layer of fibers settled on the wire-gauze has been advanced to the upper portion of the drum, it is removed from the wire-gauze by means of compressed air directed on to the outside of the drum from a row of holes 27 in a pipe 28 connected to a pressure air conduit 29 and mounted above and parallel to the drum. The fibers fall down into the funnel 20 and are pumped out through the tube 12. The part of the wire-gauze that has passed over the funnel is hit by a spray of water from a row of holes in a water pipe 30 arranged along the drum and is thereby cleansed from fibers still clinging, which might clog the meshes.

The device described makes it possible without difficulty to keep the fiber content of the waste water discharged from the drum at about 10 mg./litre, and in certain cases it has even been possible to reach such a low value as 4 mg./litre, i.e. a lower content of organic substance than that which occurs in many natural raw waters.

I claim:

1. Apparatus for recovering fibers from liquid comprising a vessel, a filter drum rotatably mounted on a stationary tubular shaft in the vessel and consisting of two solid end walls joined by a perforated drum jacket, axially extending ribs provided in spaced relationship around the inner periphery of the drum jacket, means for rotating the drum in a predetermined direction, an axial inlet for liquid to be filtered through one end of the tubular shaft, means for introducing gas into the liquid to be filtered to cause at least some of the coarse fibers to rise to the surface of the liquid within the drum, a funnel mounted stationary within the drum and having its lower end connected to an outlet portion of said tubular shaft, said funnel having its open inlet end located in the upper portion of the drum to receive concentrated pulp falling down from the drum jacket passing thereover, and a stationary baffle plate extending axially along that side of the drum jacket which moves downwardly during the rotation of the drum, said baffle plate having its upper edge located at least somewhat below the inlet end of the funnel and besides having a lower portion located at a distance from the adjacent side of the drum jacket only slightly greater than the radial width of said ribs to form a peripheral channel, whereby a pumping effect is obtained through the channel, when the liquid in the drum during the rotation is held at a level above said upper edge of the plate.

2. Apparatus as claimed in claim 1 in which the upper end of the baffle plate in the drum is bent radially inwardly to form an enlarged inlet to the peripheral channel between said baffle plate and the drum jacket.

References Cited in the file of this patent
UNITED STATES PATENTS
2,765,915   Nilson _____ Oct. 9, 1956